United States Patent [19]
Grisar et al.

[11] 3,860,722
[45] Jan. 14, 1975

[54] HYPOLIPIDEMIC AGENTS
[75] Inventors: J. Martin Grisar; Roger A. Parker, both of Cincinnati, Ohio
[73] Assignee: Richardson-Merrell Inc., New York, N.Y.
[22] Filed: Sept. 22, 1972
[21] Appl. No.: 291,235

[52] U.S. Cl............. 424/308, 260/516, 260/521 R, 260/470, 260/473, 424/317
[51] Int. Cl............................................. A61k 27/00
[58] Field of Search............................ 424/308, 317

[56] References Cited
UNITED STATES PATENTS
3,716,644   2/1973   Albers et al. ..................... 424/308

Primary Examiner—Frederick E. Waddell
Attorney, Agent, or Firm—L. Ruth Hattan; Eugene O. Retter; George W. Rauchfuss, Jr.

[57] ABSTRACT

Derivatives of benzoylacetic acids, esters and salts of the following general formula are useful as hypolipidemic agents:

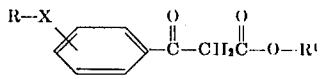

wherein R represents a straight or branched alkyl chain of from 10 to 17 carbon atoms; X represents oxygen or divalent sulfur; and $R^1$ represents hydrogen, a straight or branched lower alkyl chain of from 1 to 4 carbon atoms, or aralkyl.

13 Claims, No Drawings

HYPOLIPIDEMIC AGENTS

FIELD OF INVENTION

This invention relates to the use of alkoxy-substituted and alkylthio-substituted benzoylacetic acids, esters and salts as hypolipidemic agents and compositions comprising said compounds.

DESCRIPTION OF PRIOR ART

Methyl 4-(hexadecyloxy)benzoyl acetate is reported as an intermediate in the preparation of color couplers in British Pats. Nos. 808,276 and 873,124 and German Pat. No. 1,044,614. In vivo administration of the compounds of this invention has not been described heretofore.

SUMMARY OF INVENTION

Compounds of the following general Formula 1 are useful as hypolipidemic agents:

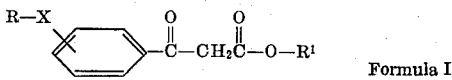

Formula I wherein R represents a straight or branched alkyl chain of from 10 to 17 carbon atoms; X represents oxygen or divalent sulfur; and $R^1$ represents hydrogen, a straight or branched lower alkyl chain of from 1 to 4 carbon atoms, or aralkyl. Pharmaceutically acceptable salts of the compounds of Formula 1 are included within the scope of this invention.

DETAILED DESCRIPTION OF INVENTION

In general Formula 1 the substituent group R–X may be attached to the meta- or para-position of the phenyl ring. It is apparent from the above Formula 1 that when X is oxygen the group R–X represents an alkoxy radical, and when X is divalent sulfur the group R–X represents an alkylthio radical.

As examples of straight or branched alkyl chains which R represents there may be mentioned decane, undecane, dodecane, 4-methylundecane, tridecane, 5-propyltetradecane, 3-propylheptane, tetradecane, 1,1-dimethyldodecane, pentadecane, heptadecane, 4-n-butyldodecane, and the like.

As examples of straight or branched alkyl chains which $R^1$ may represent there may be mentioned methyl, ethyl, propyl, isopropyl, butyl, tert-butyl, and the like. The alkyl moiety of the aralkyl group as used herein which $R^1$ may represent may contain from 1 to 4 carbon atoms. As examples of the aralkyl group there may be mentioned benzyl, phenylpropyl and the like.

Pharmaceutically acceptable salts of the compounds of Formula 1 are those formed with any suitable inorganic or organic bases such as those of alkali metal, for example, sodium and potassium; alkaline earth metals, for example, calcium and magnesium; light metals of group 111 A, for example, aluminum; organic amines such as primary, secondary or tertiary amines, for example, diethylamine, cyclohexylamine, ethylamine and pyridine. The salts can be prepared by conventional means such as by contacting and neutralizing a solution of a compound of Formula 1, having a carboxylic acid group, in a polar solvent with the stoichiometric quantity of a base, for example, sodium hydroxide. Metal salts also include complex salts, that is, metal chelates, which may be obtained by the treatment of a benzoyl acetate of Formula 1 with a metal acetate, such as, cupric acetate or zinc acetate, or by the addition of metal salts, such a calcium or magnesium salts, to a benzoyl acetic acid of Formula 1.

The compounds of this invention, can exist in both the keto form as represented by general Formula 1 and in the enol form as represented by the following general Formula 11 wherein R, X and $R^1$ have the meanings defined hereinbefore.

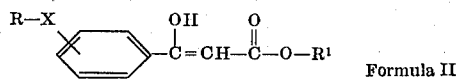

Formula II

For purposes of uniformity the illustrative compounds and specific examples of compounds of this invention are named as the keto form, that is, as represented by general Formual 1.

As examples of compounds of this invention there may be mentioned, 2-[4-(hexadecyloxy)benzoyl]acetic acid, 2-[4-(decyloxy)benzoyl]acetic acid, 2-[4-(dodecyloxy)benzoyl]acetic acid, 2-[4-(tridecyloxy)benzoyl]acetic acid methyl ester, 2-[3-(undecyloxy)benzoyl]acetic acid, 2-[4-(decylthio)benzoyl]acetic acid, 2-[4-(tetradecyloxy)benzoyl]-acetic acid ethyl ester, 2-[3-(dodecyloxy)benzoyl]acetic acid propyl ester, 2-[4-(tridecylthio)benozyl]acetic acid, 2-[4-(tetradecyloxy)benzoyl]acetic acid methyl ester, 2-[4-(heptadecyloxy)benzoyl]acetic acid, 2-[3-(pentadecyloxy)benzoyl]acetic acid, 2-[4-(1,1-dimethyldodecyloxy)-benzoyl]acetic acid tert-butyl ester, 2-[3 -(4-ethyldecylthio)benzoyl]acetic acid ethyl ester, 2-[4-(2-butylheptyloxy)benzoyl]acetic acid, 2-[4-(hexadecylthio)benzoyl]-acetic acid methyl ester, and the like.

Preferred compounds of this invention are those of general Formulas 1 and 11 wherein the substituent group represented as R-X is attached at the para-position of the phenyl ring. As examples of preferred compounds of this invention there may be mentioned, 2-[4-(3,7,11-trimethyldodecyloxy)benzoyl]acetic acid, 2-[4-(tetradecyloxy)benzoyl]acetic acid, 2-[4-(undecylthio)benzoyl]acetic acid, 2-[4-(dodecyloxy)benzoyl]acetic acid, 2-[4-(pentadecyloxy)-benzoyl]acetic acid, 2-[4-(heptadecylthio)benzoyl]acetic acid, and lower alkyl or aralkyl esters and salts of the aforementioned compounds.

Particularly preferred compounds of this invention are those of general Formulas 1 and 11 wherein the substituent group represented as R-X is attached at the para- position of the phenyl ring and X represents oxygen.

The compounds of general Formulas 1 and 11 are useful as hypolipidemic agents and can be administered to a patient to lower blood lipids, particularly cholesterol and triglycerides without concurrent accumulation of desmosterol. The dosage unit administered can be any lipid lowering effective amount. These compounds can be administered to animals, mammals and humans and are useful in the treatment of hyperlipidemic conditions such as are encountered in patients with cardiovascular diseases that can result in heart failure and stroke.

To illustrate the utility of the compounds of this invention young male rats of the Wistar strain initially weighing about 175 grams were given free access to a diet which contained 0.15 percent by weight of the test compound, that is, a compound of this invention. This diet is prepared by mixing the test compound with commerical Purina Chow (Trademark of Ralston Purina Company, St. Louis, Mo.). Groups of animals were maintained on these diets for either 4 or 10 days. Control groups of 6 rats each were given Purina Chow to which no test compound had been added. At the end of the treatment period all rats were bled by cardiac puncture, and the plasma analyzed for cholesterol and triglyceride content. The results are given in the following Table 1.

Table 1

| Test Compound | Duration of Treatment (Days) | Daily Dose mg/kg (a) | No. Rats | Plasma Cholesterol % Reduction (b) | Plasma Triglycerides % Reduction (b) |
| --- | --- | --- | --- | --- | --- |
| 2-[4-(tetradecyloxy)-benzoyl]acetic acid methyl ester | 4 | 139.1 | 6 | 31 | 60 |
| 2-[4-(hexadecyloxy)-benzoyl]acetic acid methyl ester | 4 | 141.6 | 6 | 32 | 57 |
| 2-[4-(tetradecyloxy)-benzoyl]acetic acid benzyl ester | 10 | 155 | 6 | 23.5 | 70 |

(a) Determined by measuring food consumption.
(b) Compared to untreated control rats in the same experiment.

The compounds of this invention can be administered orally or parenterally either alone or in the form of pharmaceutical preparations. Pharmaceutical preparations containing conventional pharmaceutical carriers and as active ingredients compounds of this invention can be employed in unit dosage forms such as solids, for example, tablets, capsules and pills, or liquid solutions, suspensions, or emulsions for oral and parenteral administration. The quantity of compound administered can vary over a wide range to provide from about 0.5 mg/kg (milligrams per kilogram) to about 100 mg/kg and preferably from about 10 mg/kg to 30 mg/kg, of body weight of the patient per day to achieve the desired effect. Unit doses can contain from about 50 mg to 1 g of a compound of this invention and may be administered for example, for 1 to 4 times daily.

The compounds of this invention may be prepared by several methods. By treating an R-X-substituted phenyl methyl ketone with magnesium methyl carbonate in dimethyl formamide or dimethyl acetamide followed by treatment of the resulting complex with water and a mineral acid such as hydrochloric acid, or with a lower aliphatic alcohol and a mineral acid gives respectively the R-X-substituted benzoylacetic acids and esters of general Formula 1. The reaction of the complex may be carried out at temperatures of from −30° to 50°C and preferably at temperatures of from −20° to about 25°C. The reaction time varies from one-half hour to 3 days depending upon the reaction conditions.

The R-X-substituted phenyl methyl ketones employed in the above described reaction may be prepared by a Williamson reaction [J. March, Advanced Organic Chemistry: Reactions, Mechanisms and Structures, McGraw-Hill, p. 316 (1968)] reacting an appropriate hydroxyacetophenone or mercaptoacetophenone with a lower alkylhalide.

The esters of the benzoyl acetic acid derivatives of this invention may be prepared by condensing an R-X-substituted benzoyl halide or an R-X-substituted benzoic acid ester with either an ester or acetoacetic acid followed by alkaline hydrolysis of the resulting aroylacetoacetate or an ester of acetic acid employing a basic catalyst. These condensation reactions are generally complete within a period of up to about 48 hours and may be carried out with or without solvent. Suitable solvents include aromatic hydrocarbons such as benzene, toluene, xylene, and the like, or halogenated aromatic solvents, for example, chlorobenzene, chlorotoluene, dichlorobenzene, and the like. As examples of suitable basic catalysts there may be mentioned, for example, sodium, sodium methoxide, sodium ethoxide, sodium hydride or sodium carbonate. The reaction temperature may vary from about 25°C to the reflux temperature of the solvent employed.

The appropriately substituted benzoyl halides and benzoic acid esters, which find use in the above described condensation reaction, are commercially available or may be prepared by well known methods. For example alkoxy- or alkylthio-benzenes are reacted with acetyl chloride under the conditions of a Friedel-Crafts reaction similar to that described by A. Zaki and H. Fahim in J. Chem. Soc. (1942), 1, 307, to produce alkoxy- or alkylthio-substituted phenyl methyl ketone which can be oxidized to the corresponding substituted benzoic acid using sodium bromite in an analogous manner to the method of Wm. Johnson, G. Gutsche and R. Offenhauer, J. Am. Chem. Soc. 68 (1946), 1,648. Reaction of the substituted benzoic acid with excess thionyl halide or with a lower alcohol results in the formation of the substituted benzoyl halides and benzoic acid esters respectively.

Additionally the esters of the benzoylacetic acid derivatives of this invention may be prepared by a Friedel-Crafts acylation of an appropriately R-X-substituted benzene derivative with a carb-(lower)alkoxyacetyl halide, such as bromide or chloride. The acylation reaction may be carried out under a variety of solvents, for example, 1,1,2,2-tetrachloroethane, carbontetrachloride, nitrobenzene, or carbon disulfide, and under catalysis of a variety of Lewis acids, such as, aluminum chloride, zinc chloride, or stannous chloride.

The temperature and duration of the reaction may be varied to allow for optimum reaction conditions.

The R-X-substituted benzene derivatives employed in the above described Friedel-Crafts reaction may be prepared by the Williamson reaction cited hereinbefore by reacting an appropriate phenol or thiophenol with an alkyl halide. The carb-(lower)alkoxyacetyl halides may be prepared from dialkyl malonates by the method of P. Freon and F. Tatibouet, Compt. Rend. 244, 2,399 (1957).

The esters of general Formulas 1 to 11 can be prepared from the corresponding acids and an appropriate alcohol by standard esterification procedures. Similarly, low-boiling esters of this invention may be converted to higher-boiling ones by standard transesterification procedures as described in J. March, *Advanced Organic Chemistry: Reactions, Mechanisms and Structures*, McGraw-Hill, p. 322 (1968).

The following specific examples are illustrative of the invention.

Example 1

2-[4-(Hexadecyloxy)benzoyl]acetic acid

A mixture of magnesium methyl carbonate in dimethyl formamide (460.0 g. of a 2.0 mM/g solution) is heated on a 120°C oil bath with stirring under carbon dioxide flushing for one-half hour. To this mixture is added 54.0 g (0.150 mole) of 4'-(hexadecyloxy)acetophenone, and the oil bath temperature is raised to 140°–150°C. Dry nitrogen is flushed through the mixture for 5 hours. The mixture is then allowed to cool to room temperature under carbon dioxide flushing after which it is poured slowly into 6 liters of concentrated HCl-ice (1:1) with vigorous stirring. When the evolution of gas is complete the precipitate is collected and washed with cold water then dried to give 2-[4-(hexadecyloxy)benzoyl]acetic acid, M.P. 88°–90°C (dec.).

EXAMPLE 2

2-[4-(Hexadecyloxy)benzoyl]acetic acid methyl ester

To a cooled suspension of 9.3 g [0.023 mole] of 2-[4-(hexadecyloxy)benzoyl]acetic acid in 800 ml of anhydrous ether is added 0.1 mole of diazomethane prepared by the method of F. Arndt, Org. Syn. Coll. vol. 2, 165 (1,943), in 200 ml of ether followed by 1.0 ml of borontrifluoride-etherate. The mixture is allowed to stand overnight at room temperature after which it is poured into iced-water. The ether layer is separated, washed with water, dried over sodium sulfate, and evaporated to dryness to give 2-[4-(hexadecyloxy)benzoyl]acetic acid methyl ester, M.P. 55°–59°C.

EXAMPLE 3

2-[4-(Hexadecyloxy)benzoyl]acetic acid, potassium salt

Approximately 1.0 g of 2-[4-(hexadecyloxy)benzoyl]-acetic acid in 500 ml of a 3:2 solution of hexane-acetone is treated with about 2.0 g of potassium carbonate. The mixture is refluxed for 1 hour then allowed to cool to room temperature after which it is diluted with 300 ml hexane. The precipitate is collected, washed with 800 ml cold water and air dried to give 2-[4-(hexadecyloxy)-benzoyl]acetic acid, potassium salt, M.P. 125°–145°C.

EXAMPLE 4

2-[4-(Tetradecyloxy)benzoyl]acetic acid methyl ester

A mixture of 174 g (1.5 moles) of methyl acetoacetate and 34.5 g sodium in 3 liters of benzene is refluxed for 20 hours, then cooled and 600 g (1.7 moles) or 4-tetradecyloxybenzoyl chloride is added over a 2 hour period. The mixture is refluxed for 6 hours, cooled by the addition of ice and shaken. The benzene layer is separated, washed with 5 percent sodium bicarbonate solution and dried. The benzene is distilled off yielding methyl 2-(4-tetradecyloxy)benzoyl acetoacetate. To a solution of 32 g of ammonium chloride in 150 ml of water at 40°C is added 90 g of methyl 2-(4-tetradecyloxy)benzoyl acetoacetate maintaining the temperature at 40°C for 15 minutes followed by rapid cooling. The solution is extracted with 200 ml of ether and the extracts dried. The product is recrystallized twice from methanol to give 2-[4-(tetradecyloxy)benzoyl]acetic acid methyl ester, M.P. 52°–55°C.

EXAMPLE 5

2-[4-(Dodecyloxy)benzoyl]acetic acid methyl ester

A mixture of 61.5 g of dodecyl phenyl ether, 52.5 g of aluminum chloride and 125 ml of 1,1,2,2-tetrachloroethane is stirred at 10°C while 40 g of carbomethoxy acetylchloride is added dropwise. The reaction mixture is warmed cautiously until the exothermic reaction subsides, then is heated to 95°C for 5 hours. After cooling the mixture is added to ice and hydrochloric acid and extracted with tetrachloroethane. The organic layer is separated, dried over magnesium sulfate and concentrated *in vacuo*. The residue is recrystallized twice from methanol to give 2-[4-(dodecyloxy)benzoyl]acetic acid methyl ester, M.P. 30°–40°C.

EXAMPLE 6

2-[4-(Tetradecyloxy)benzoyl]acetic acid

Magnesium methyl carbonate in dimethyl formamide (900.0 g of a 2.0 mM/g solution) is flushed with dry carbon dioxide and heated with stirring on an oil bath at 130°–140°C for one-half hour after which 100.0 g (0.300 mole) of 4'-(tetradecyloxy)acetophenone is added. The reaction mixture is heated on an oil bath at 130°–150°C with stirring while nitrogen is flushed through the mixture for 4½ hours. Upon cooling the mixture is poured slowly into 8 liters of ice-concentrated HCl (1:1) and stirred for 1 hour. A white precipitate forms and is collected, washed with water and dried to give 2-[4-(tetradecyloxy)benzoyl]acetic acid, M.P. 86°–89°C. (effervesces).

EXAMPLE 7

2-[4-(Tetradecyloxy)benzoyl]acetic acid methyl ester

A mixture of 5.0 g (0.0133 mole) of 2-[4-(tetradecyloxy)benzoyl]acetic acid and 100 ml of anhydrous ether is stirred with cooling on an ice bath after which 5.0 g (0.0235 mole) of trifluoroacetic anhydride is added. The mixture is allowed to warm to room temperature for ½ hour then with continued cooling on an ice bath 10.0 g (0.312 mole) of methanol is added with stirring. The mixture is warmed to room temperature for 1 hour then evaporated to dryness under reduced pressure. The remaining residue is recrystallized twice from methanol to give 2-[4-

(tetradecyloxy)benzoyl]acetic acid methyl ester, M.P. 50°–56°C.

EXAMPLE 8

2-[4-(tetradecyloxy)benzoyl]acetic acid ethyl ester.

A mixture of 20.0 g (0.0532 mole) 2-[4-tetradecyloxy)benzoyl]acetic acid and 400 ml of anhydrous ether is stirred with cooling in an ice bath after which 20.0 g (0.0950 mole) of trifluoroacetic acid is added. The mixture is warmed to room temperature for 45 minutes. With continued cooling in an ice bath 60.0 g (1.3 mole) of ethanol is added, and the mixture is allowed to stand at room temperature for about 16 hours. The mixture is then poured into ice water and extracted with ether. The ether layer is washed successively with cold water, 5 percent aqueous sodium bicarbonate, saturated sodium chloride solution then dried over sodium sulfate and evaporated to dryness under reduced pressure. The resulting residue is recrystallized from ethanol to give 2-[4-(tetradecyloxy)benzoyl]acetic acid ethyl ester, M.P. 31°–33°C.

EXAMPLE 9

2-[4-(Tetradecyloxy)benzoyl]acetic acid benzyl ester

By the general procedure of Example 8 only substituting for ethanol, an appropriate amount of benzyl alcohol, 2-[4-(tetradecyloxy)benzoyl]acetic acid benzyl ester is obtained, M.P. 49°–52°C.

EXAMPLE 10

By the general procedure of Example 1 only substituting for 4'-(hexadecyloxy)acetophenone an appropriate amount of 4'-(decylthio)acetophenone or 3'-(undecyloxy)acetophenone the following respective compounds are obtained: 2-[4-(decylthio)benzoyl]acetic acid, 2-[3-(undecyloxy)benzoyl]acetic acid.

EXAMPLE 11

Following the general procedure of Example 1 only substituting for 4'-(hexadecyloxy)acetophenone an appropriate amount of 4'-(dodecylthio)acetophenone, 4'-(hexadecylthio)acetophenone, or 3'-(hexadecyloxy)acetophenone the following compounds are obtained respectively: 2-[4-(dodecylthio)benzoyl]acetic acid, 2-[4-(hexadecylthio)benzoyl]acetic acid, 2-[3-(hexadecyloxy)benzoyl]acetic acid.

EXAMPLE 12

An illustrative composition for a hard gelatin capsule is as follows:

| | Per Capsule |
|---|---|
| (a) 2-[4-(tetradecyloxy)benzoyl]-acetic acid ethyl ester | 300 mg |
| (b) talc | 45 mg |

The dry powders of (a) and (b) are passed through a fine mesh screen and mixed well, then filled into hard gelatin capsules at a net fill of 345 mg per capsule.

EXAMPLE 13

An illustrative composition for tablets is the following:

| | | Per Tablet |
|---|---|---|
| (a) | 2-[4-(hexadecyloxy)benzoyl]-acetic acid methyl ester | 200 mg |
| (b) | wheat starch | 20 mg |
| (c) | lactose | 37 mg |
| (d) | magnesium stearate | 3 mg |

The granulation obtained upon mixing lactose with the starch and granulated starch paste is dried, screened and mixed with the active ingredient (a) and magnesium stearate. The mixture is compressed into tablets weighing 260 mg each.

EXAMPLE 14

An illustrative composition for pills is the following:

| | | Per Pill |
|---|---|---|
| (a) | 2-[4-(tetradecyloxy)benzoyl]-acetic acid benzyl ester | 200 mg |
| (b) | corn starch | 130 mg |
| (c) | liquid glucose | 20 ml |

The pills are prepared by blending the active ingredient (a) and the corn starch then adding the liquid glucose with thorough kneading to form a plastic mass from which the pills are cut and formed.

We claim:

1. A method of reducing the lipid concentration in the blood of a patient in need thereof which comprises administering orally or parenterally to said patient an effective hypolipidemic amount of a compound selected from the group consisting of a compound of the formula

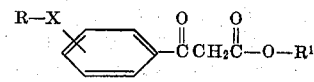

wherein the substituent group represented as R-X is attached at the meta- or para- position of the phenyl ring, and wherein X is oxygen or divalent sulfur; R is a straight or branched alkyl chain of from 10 to 17 carbon atoms; and $R^1$ is hydrogen, a straight or branched lower alkyl chain of from 1 to 4 carbon atoms, or phenylalkyl wherein the alkyl moiety contains from 1 to 4 carbon atoms; and a pharmaceutically acceptable salt thereof.

2. The method of claim 1 wherein the amount of compound administered is from 0.5 mg/kg to 100 mg/kg of body weight of said patient per day.

3. The method of claim 2 wherein the compound is administered orally.

4. The method of claim 3 wherein the substituent group represented as R-X is attached to the para-position of the phenyl ring.

5. The method of claim 4 wherein X is oxygen.

6. The method of claim 5 wherein the compound is 2-[4-(tetradecyloxy)benzoyl]acetic acid methyl ester.

7. The method of claim 5 wherein the compound is 2-[4-(tetradecyloxy)benzoyl]acetic acid benzyl ester.

8. The method of claim 5 wherein the compound is 2-[4-(hexadecyloxy)benzoyl]acetic acid methyl ester.

9. A pharmaceutical composition having blood lipid lowering activity comprising in unit dosage form from about 50 mg to 1 g of a compound selected from the group consisting of a compound of the formula

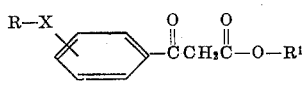

wherein the substituent group represented by R-X is attached at the meta- or para- position of the phenyl ring and wherein X is oxygen or divalent sulfur; R is a straight or branched alkyl chain of from 10 to 17 carbon atoms; and $R^1$ is hydrogen, a straight or branched lower alkyl chain of from 1 to 4 carbon atoms, or phenylalkyl wherein the alkyl moiety contains from 1 to 4 carbon atoms; and a pharmaceutically acceptable salt thereof, in admixture with a pharmaceutically acceptable carrier.

10. A composition of claim 9 wherein the substituent group represented as R-X is attached to the para- position of the phenyl ring, and X represents oxygen.

11. A composition of claim 10 wherein the compound is 2-[4-(tetradecyloxy)benzoyl]acetic acid methyl ester.

12. A composition of claim 10 wherein the compound is 2-[4-(tetradecyloxy)benzoyl]acetic acid benzyl ester.

13. A composition of claim 10 wherein the compound is 2-[4-(hexadecyloxy)benzoyl]acetic acid methyl ester.

* * * * *